United States Patent
Bleckmann et al.

(10) Patent No.: US 6,827,817 B2
(45) Date of Patent: Dec. 7, 2004

(54) METHOD AND APPARATUS FOR PRODUCTION OF RF LABELS

(75) Inventors: Frederick Bleckmann, Dover, NH (US); Gilbert A. Bleckmann, Pittsfield, NH (US)

(73) Assignee: Pittsfield Weaving Co., Inc., Pittsfield, NH (US)

(*) Notice: Subject to any disclaimer, the term of this patent is extended or adjusted under 35 U.S.C. 154(b) by 215 days.

(21) Appl. No.: 10/143,842

(22) Filed: May 14, 2002

(65) Prior Publication Data

US 2002/0189750 A1 Dec. 19, 2002

Related U.S. Application Data

(60) Provisional application No. 60/336,573, filed on Dec. 4, 2001, and provisional application No. 60/290,652, filed on May 15, 2001.

(51) Int. Cl.[7] .............................................. B32B 31/10
(52) U.S. Cl. ....................... 156/731; 156/200; 156/204; 156/226
(58) Field of Search ................................. 156/200, 204, 156/201, 203, 226, 227, 73.1; 493/405

(56) References Cited

U.S. PATENT DOCUMENTS

| | | | |
|---|---|---|---|
| 4,752,351 A | 6/1988 | Lunt | |
| 4,847,934 A | 7/1989 | Weber | |
| 5,583,489 A | 12/1996 | Loemker et al. | |
| 5,863,383 A | 1/1999 | Bussey | |
| 6,637,490 B1 * | 10/2003 | Azulay | 156/515 |
| 2001/0050616 A1 * | 12/2001 | Lowe | 340/572.1 |

FOREIGN PATENT DOCUMENTS

| | | | |
|---|---|---|---|
| DE | 2624055 A | * 2/1978 | |
| NL | 1014737 C6 | * 9/2001 | |
| WO | WO 00 50239 | 8/2000 | |

OTHER PUBLICATIONS

Notification and International Search Report mailed Sep. 19, 2002.

* cited by examiner

Primary Examiner—Jeff H. Aftergut
Assistant Examiner—Barbara J Musser
(74) Attorney, Agent, or Firm—Nixon Peabody, LLP

(57) ABSTRACT

The present invention includes a method for producing individual folded labels incorporating a radio frequency device, the method comprising the steps of providing a ribbon of labels containing a woven logo or text. A carrier strip with a plurality of radio frequency devices spaced thereon is provided and the plurality of radio frequency devices are joined to the ribbon of labels. The ribbon of labels is then folded so as to form at least one folded portion. The folded ribbon is subjected to sufficient heat and pressure to set the at least one folded portion. The ribbon of labels is subdivided into individual folded labels. The present invention also relates to a label-making apparatus including a dispenser for a carrier strip having a plurality of radio frequency devices disposed thereon at spaced intervals. A mechanism linearly advances a ribbon of labels, the ribbon of labels containing a woven logo or text. Means join the plurality of radio frequency devices with the ribbon of labels. A cutting station subdivides an individual label from the ribbon of labels and plurality of radio frequency devices. A sensor in communication with the linear advance mechanism controls the advance of a length of the ribbon of labels to provide proper spacing between the radio frequency devices, cut-edges and a logo on the label. The sensor can sense the position of the RF device or the logo or text of the ribbon of labels.

11 Claims, 8 Drawing Sheets

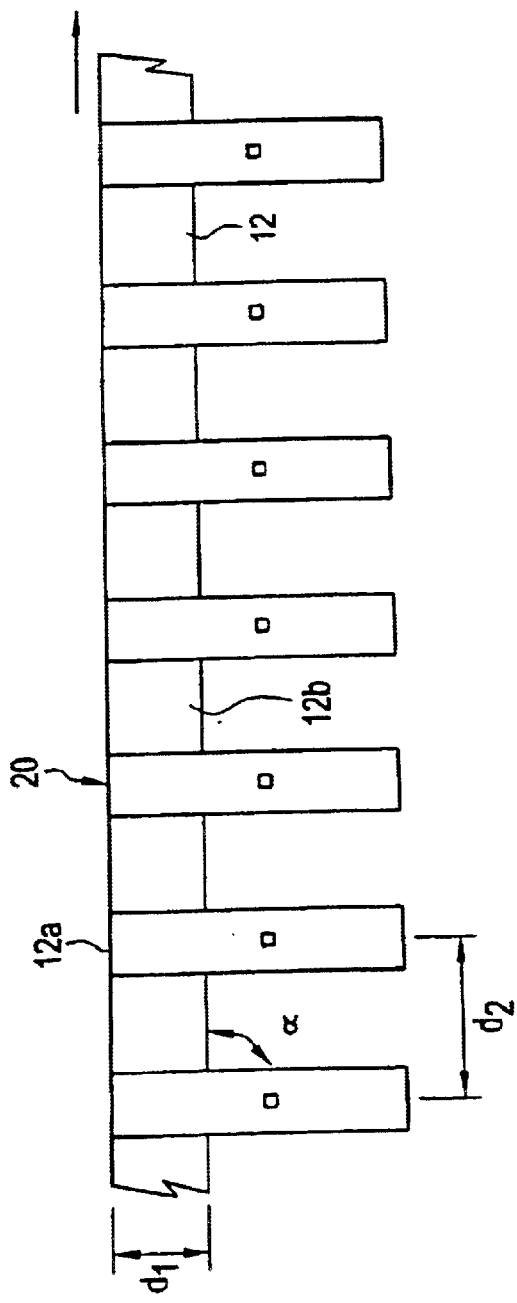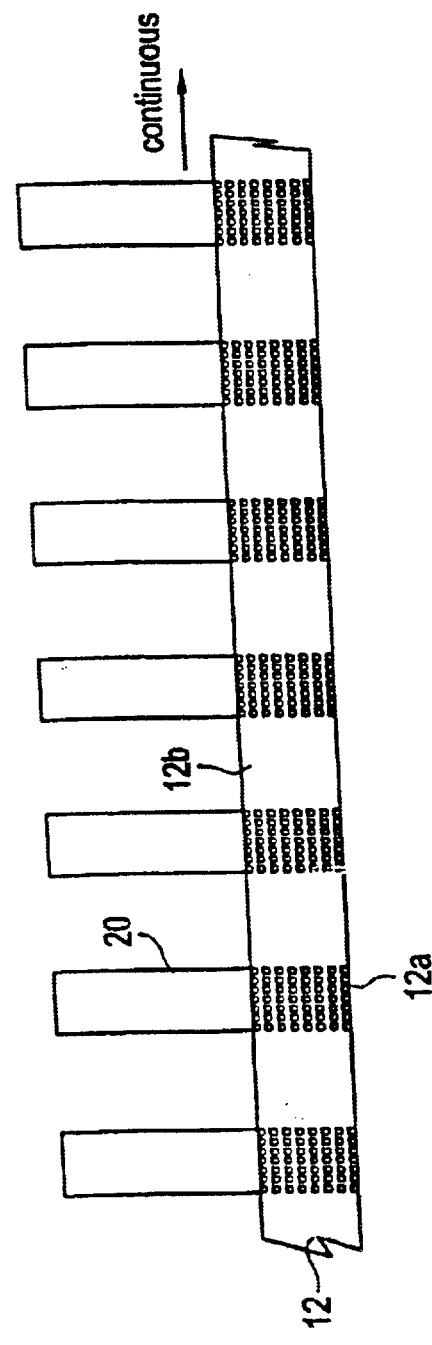

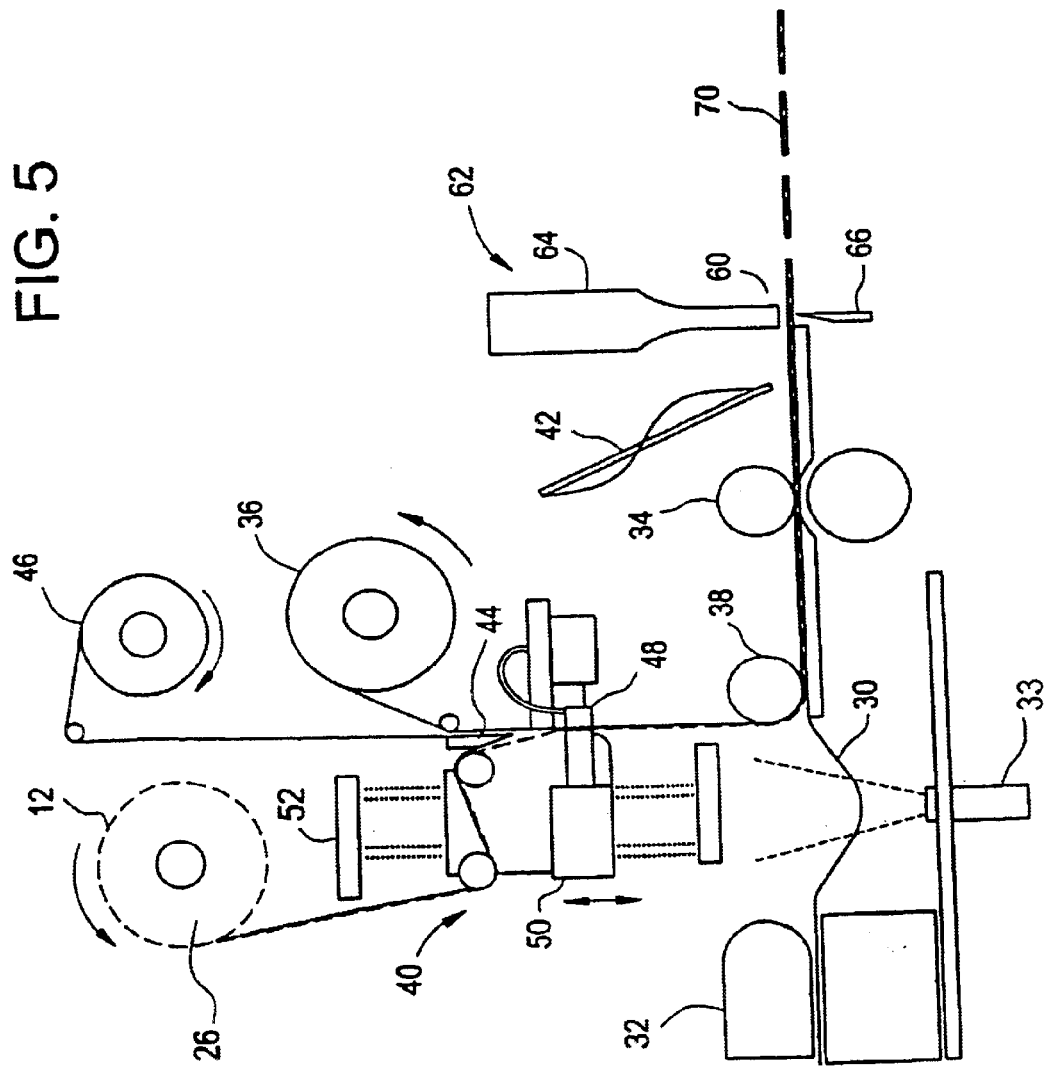

METHOD AND APPARATUS FOR PRODUCTION OF RF LABELS

RELATED APPLICATIONS

This application claims priority of U.S. Provisional Application Ser. Nos. 60/290,652 filed May 15, 2001 and 60/336,573 filed Dec. 4, 2001.

This application is also related to co-pending U.S. patent application Ser. No. 09/603,234 entitled "Method and Apparatus for Production of Labels."

BACKGROUND OF THE INVENTION

1. Field of the Invention

The present invention relates to a method and apparatus for the production of folded radio frequency (RF) labels for application to clothing, linens, towels, and other goods, and more particularly to a label incorporating radio frequency (RF) devices produced by the apparatus and method of the invention.

2. Description of the Related Art

The attachment of labels to cloth goods such as clothing, linens and towels is a common practice used to set forth information such as trademarks and trade names, material identification and characteristics, sizes, care instructions, and so forth. In addition, legal requirements necessitate the use of labels in clothing or on linens. A method and apparatus for producing individual folded labels from a ribbon of labels is presented in published PCT application WO 00/50239 and is incorporated in its entirety herein.

Folded labels are commonly used in the industry and come in a number of different forms including endfolds, centerfolds, J folds, Booklet fold, Manhattan-folds, and mitrefold labels. While each of these different forms has a particular use, the centerfold and end-fold labels are the most popular.

In addition to providing this important information, the label is part of the object. Unfortunately, it is not unusual for a label, especially a skin contact clothing label, to irritate the customer. This can result in the customer forming a negative attitude regarding the quality of the entire garment. Quite often the customer will cut the offending label out of the garment. This not only prevents the customer from having the proper care instructions, it also removes the product identification from the garment, further reducing repeat sales.

Currently most folded labels are produced using what is referred to in the industry as the "cut and fold" technique, that is the labels are indexed, cut from a ribbon of material and then folded. Using this technique about 40–220 labels can be produced a minute with between 5–20% of the labels being considered waste or defective. The most common defect being a distorted fold resulting in the ends of the label not aligning properly. Other defects include turned corners, fanning, and protruding fold-unders.

Defective labels can significantly increase the cost of the goods. For example, while it costs only about fifteen to twenty-five cents to sew a label into a garment in the United States, it can cost five to ten times this amount to replace a defective label. Many labels, especially centerfold, have a tendency to skew while being sewed, thereby increasing the chance for a poor impression. Moreover, RF devices range in cost from three cents to over one dollar. Thus, a defective label can add tremendous cost. If the defective label is not detected and replaced, the goods may have to be classified as seconds and sold at a steep discount. Significantly, if the identification of the defective label is missed it is likely to be recognizable by the customer and adversely affect the overall impression of the goods. The present invention prevents such defects.

It would be desirable to be able to produce folded labels incorporated with RF devices for storing and transmitting identifying information and that are more comfortable to the apparel customer than current labels. In addition, it is desirable to produce such labels at a higher speed and at a greater efficiency of production for both label and end product manufacturers, and with fewer defects than current methods.

SUMMARY OF THE INVENTION

The present invention has been developed with the view towards substantially changing the way that labels are used and developed. In particular, an object of the present invention is to provide steps for producing a ribbon of labels with RF devices encapsulated therein, and subdividing the ribbon into individual RF labels using ultrasonic means resulting in individual folded RF labels that are both soft to the touch, i.e., having edges that are generally scratchless to the apparel consumer, and capable of storing and transmitting identifying information and at the same time virtually free of defects.

Another object of the present invention is to provide steps for incorporating the RF devices into the labels whereby inventory control, pricing control and the tracking of the origin of the merchandise, for example, can be done via the RF devices in the labels.

The present invention also provides a method and apparatus for attaching a RF device to a carrier strip so that it may be processed into labels.

The feel of the labels produced in accordance with the present invention assures that the RF labels will remain on the garment when the customer is ready to reorder. Additionally, the use of ultrasonic means to subdivide the RF labels results in a label having the front and back folds sealed together thus preventing the label from being skewed when sewed into a garment. This makes the sewing step more efficient and results in a reduced number of finished goods being classified as seconds, thus providing added cost savings to the garment manufacturer. Furthermore, the present invention allows for the production of RF labels at a rate of 200 to over 1000 per minute, at efficiencies of better than 90%, and at a waste of less than 4%. This is significantly higher than the 40–220 labels per minute produced using the current "cut and fold" technique.

In one embodiment, the folded pressed ribbon is indexed and then ultrasonically subdivided into individual RF labels.

In an alternative embodiment, the folded and pressed ribbon is rerolled and shipped to an end user for use in an auto-sewing device.

The present invention further includes an apparatus for carrying out this method as well as RF labels produced in accordance with the method.

Still another object of the present invention is to provide for insertion of a device such as an antenna, computer chip, radio frequency inventory/antitheft control devices, acoustical, magnetic or other security or inventory control devices within the folded labels. Such devices may be part of a web or laminate. After the insertion of such inventory/anti-theft devices, edges of the label are sealed and bonded together using known techniques, preferably ultrasonics. As will be discussed in more detail below, such an inventory/anti-theft control device, e.g. a RF device, can be inserted before or after the folding step.

Another object of the present invention is to provide an apparatus and method for inserting a radio frequency device into a ribbon of labels and registering the cut of the ribbon of labels by sensing the edge or part of the radio frequency device located therein. In this manner, when subdividing the label of ribbons, the actual RF device is detected and not the logo or text message on the label, which decreases the chance of ruining the more expensive RF devices.

In accomplishing these and other objects of the present invention, there is provided a method for producing individual folded labels incorporating a radio frequency device, the method comprising the steps of providing a ribbon of labels containing a woven logo or text. A carrier strip with a plurality of radio frequency devices spaced thereon is provided and the plurality of radio frequency devices are joined to the ribbon of labels. The ribbon of labels is then folded so as to form at least one folded portion. The folded ribbon is subjected to sufficient heat and pressure to set the at least one folded portion. The ribbon of labels is subdivided into individual folded labels.

In accomplishing these and other objects of the present invention, there is also provided a label-making apparatus comprising a dispenser for a carrier strip having a plurality of radio frequency devices disposed thereon at spaced intervals. A mechanism linearly advances a ribbon of labels, the ribbon of labels containing a woven logo or text. Means join the plurality of radio frequency devices with the ribbon of labels. A cutting station subdivides an individual label from the ribbon of labels and plurality of radio frequency devices. A sensor in communication with the linear advance mechanism controls the advance of a length of the ribbon of labels to provide proper spacing between the radio frequency devices, cut-edges and a logo on the label.

The apparatus of the present invention can further comprise an insertion assembly to insert an inventory/anti-theft control device, such as those discussed above, into the RF labels. The insertion assembly can be positioned before or after the folding station or after indexing. In all embodiments, the apparatus can be configured for left or right-hand operation to allow a user to operate more than one unit.

These and other objects, features, aspects, and advantages of the present invention will become more apparent from the following detailed description of the preferred embodiment relative to the accompanied drawings, in which:

BRIEF DESCRIPTION OF THE DRAWINGS

FIG. 3 is a front side view of the carrier strip and attached RF devices assembled by the apparatus of FIG. 1.

FIG. 4 is a back side view of the carrier strip and RF devices of FIG. 3.

FIG. 5 is a perspective view of an apparatus according to one embodiment of the present invention for producing a folded label having a RF device incorporated therein.

DETAILED DESCRIPTION OF PREFERRED EMBODIMENTS

Figure 1:
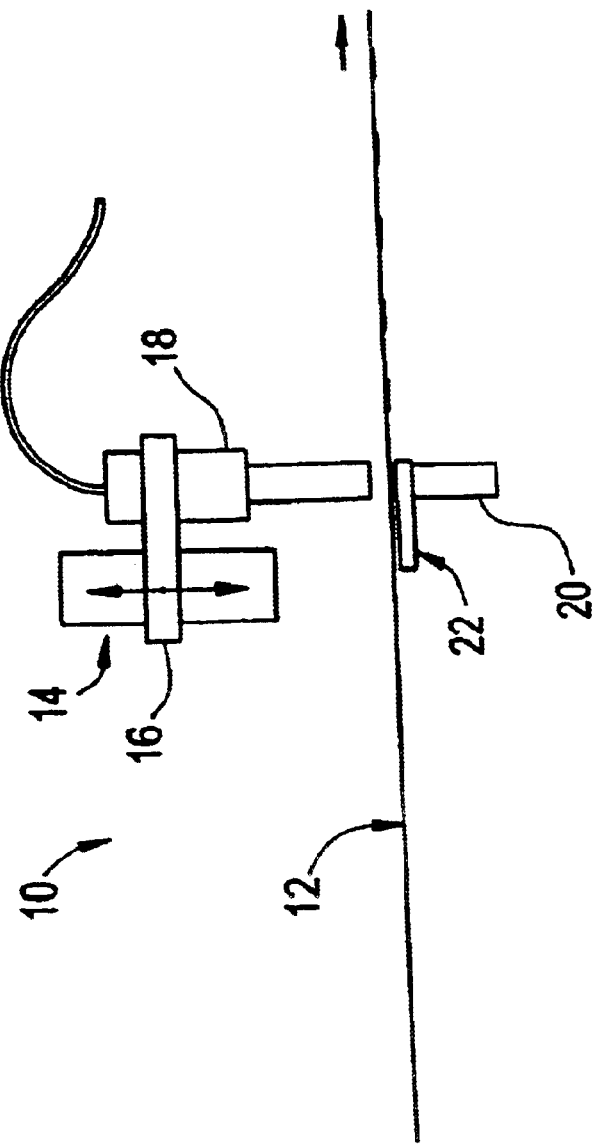
FIG. 1 is a perspective view of an apparatus for attaching an RF device to a carrier strip.

For a general understanding of the features of the present invention, reference is made to the drawings, wherein like reference numerals have been used throughout to identify identical or similar elements. FIG. 1 is a perspective view of an apparatus 10 for attaching a plurality of RF devices 20 to a carrier strip or tape 12. Carrier 12 is made of a woven polyester tape. The apparatus of the embodiment of FIG. 4 includes carrier 12, a THK linear track 14, a bracket 16, a 40 Khz ultrasonic welder 18, and a solid surface 22.

Figure 2:
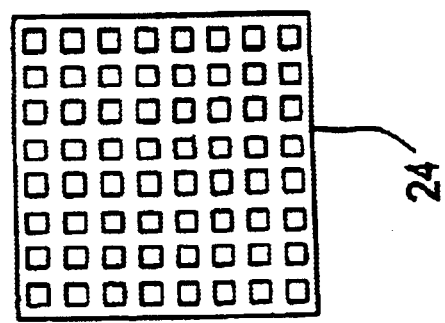
FIG. 2 is a bottom view of the bar horn of the ultrasonic welder of the apparatus of FIG. 1.

As carrier tape 12 advances it passes over support surface 22. Carrier 12 can travel via a linear advance or other advance mechanism. At support surface 22 the RF devices or tags are inserted between surface 22 and tape 12, such that the RF devices are located below strip 12. The ultrasonic welder 18 is located above tape 12. Welder 18 is mounted on linear track 14 and bracket 16, such that the welder can be moved upward and downward to adhere the RF device to strip 12. As shown in FIG. 2, ultrasonic welder 18 includes bar horn 24, the face of which seals RF device 20 to strip 12. For example, ultrasonic welder 18 has soundwaves traveling through it at a frequency of 40 KHz. However, the ultrasonic settings of welder 18 can be adjusted based upon the material of strip 12. Moreover, the actuation speed of linear track 14 can be coordinated with the advance speed of strip 12.

Referring to FIGS. 3 and 4, the front and back sides of strip 12 with RF devices 20 adhered thereto are illustrated. Strip 12 can have a width $d_1$, of for example, 15.0 mm. The centerlines of consecutive RF devices are spaced by a distance $d_2$. Distance $d_2$ can be 30.0 mm, for example. Moreover, RF devices 20 are orientated with carrier strip 12 such that an angle α therebetween is 90°.

As shown in FIGS. 3 and 4, one end of RF device 20 extends from edge 12b of strip 12. However, the opposite end of RF device 20 does not extend over edge 12a of carrier strip 12. The RF devices encapsulated in the labels can include scannable circuitry embedded in the labels. It should be appreciated that many arrangements of attachment are possible.

Referring to FIG. 5, a first embodiment of an apparatus for attaching RF devices to a woven label is shown. Carrier strip 12 having RF devices adhered thereto is mounted on a roller 26. Folded ribbon 30 of material containing labels is advanced from a press station 32 via a drive roller 34. The apparatus has two linear drive mechanisms. The first, which is part of the press station, is an uninterrupted linear advance, which maintains tension during folding. The second is an indexing mechanism. Regulating the tension of the ribbon of material is important during the folding process. In particular, the upper edge and the lower edge of the material must be maintained at essentially equal tensions. A centerline of the material is the main control for this adjustment. The centerline is preferably setup equal to the centerline of the press unit and the folding station. Raising or lowering the roll from this point can be done to equalize the tensions in the upper and lower edge of the material.

Folded ribbon of labels 30 can be composed of virtually any material that can be cut and pressed including a thermoplastic material (e.g., polyester), acetate, cotton, nylon, linen, paper, rayon and combinations thereof, in woven and non-woven form. Polyester is preferred. The labels can be printed or woven, however, woven is preferred.

It is preferred that the logo of the label is made such that it is 90 degrees from the typical orientation used in broadloom, needeloom or shuttleloom weaving of the woven labels. For woven labels this can be readily done on existing harness repeats. The change of orientation greatly reduces "window shading" (curling after laundering) and decreases shrinkage when the product is exposed to heat at temperatures above 275° F.

In the folding station (not shown) folded label ribbon 30 can be guided through a series of adjustable equalizing rollers (not shown) that make up the tension equalizer assembly to provide an even distribution of tension. After emerging from the equalizing rollers, the ribbon is guided over a folding rod (not shown).

For producing a centerfold label, the folding station comprises two folding lenses (not shown). Folding lenses are pivotably mounted on supports and can be adjusted vertically. The lenses are a caliper-like device comprising two adjustable jaws. The lenses restrain and guide the material into an even consistent fold. One lens can be a guiding lens used for making for slight adjustments before the material enters the other lens, the working lens that brings the ribbon to a fold. In certain situations a proper fold can be obtained using more or less that two lenses.

It is preferred that the distance along the x-axis on the lens be ½ of the loom cut width +1.5 mm or −1.5 mm depending on the thickness and stability of the material being processed. The y-axis distance should allow for even flow of material. Changing lenses to a larger or smaller diameter may be necessary for widths over 120 mm or below 50 mm.

Movement of the lens in the "+" x-axis direction will create a larger top fold. Movement of the lens in the "−" x-axis direction will create a larger bottom fold. Placement of the y-axis for both lens is along a centerline. If the material has a tendency to twist then an angle downward or upward may be set on either lens.

It is preferable that the location of folding rod (not shown) be kept in center with folding lenses along the centerline. The folding rod is square to the base. Material angle is kept from 5°–170°, more preferably 30°–90°. The distance from the folding rod to the press unit is dictated by the loom cut width of the material being folded. The wider the tape/ribbon cut, the further the folding rod is located from the press unit. The folded material exits the folding station and enters the press station. The press station subjects the folded material to both heat (100°–400° F.) and pressure. A range of pressure between 5–80 pounds of force is preferred. In one embodiment, the press unit includes a support frame upon which are movably affixed belt rolls about which is positioned a high temperature resistant endless conveyor belt. The belt may be driven at selected, controlled, constant speeds by known means such as an AC or DC electric drive motor and speed regulator or controller. Between the affixed belt rolls are a series of rollers, spring mounted to the support frame, upon which the top of the conveyor rides.

The speed of the press station motor can be trimmed with an ultrasonic range-finder that is wired into the motor controller inside the unit. A speed signal is sent to the servo-motor. From this signal a calculation is made and held in memory. The ultra sonic range finder makes a reading of the slack of material as it travels between press station and cutting station. This is added to the number held in memory and this sum is sent to the belt drive motor to control belt speed.

The press station can have multiple heat zones that can be controlled separately. The first heat zone can be designed to carry most of the heat and the heat zones can be designed as a cool down area. The settings of the press station are dictated by the type of material being processed. Thicker materials require a higher press setting and more heat, while thinner materials require less.

The folded material travels though the press unit via a conveyer mechanism. It is this conveyor mechanism that provides a linear advance pulling the ribbon from the tension let off device through the folding station. Other mechanisms for linear advance can be used.

The folded pressed ribbon exits the press station and is led to the cutting station on a support plate. Upon advance of the material, downward pressure from the roll is dependent on material thickness, and structure. Thinner, looser structure materials require low pressure. Thicker and more stable structures of material require a higher downward pressure.

Referring once again to FIG. 5, a sensor 33 is used to monitor and control the slack of the folded ribbon of labels 30 between an applicator unit 40, which will be described further herein, and drive roller 34 through a control unit (not shown). The speed of the applicator 40 is controlled to stay consistent with the advancing material and the delays set for cut time and acceleration and deceleration of the servo motor that turns drive roller 34.

A roll of ribbon of material 36 is also advanced via drive roller 34. Drive roller 34 pulls folded ribbon of labels 30 and fabric ribbon of material 36 forward and under a fiber optic eye 42. To maintain the proper alignment for materials with logos and written instructions such as woven or printed labels, the fiber optic eye is used, which reads color contrast as material advances past its read point. When a registration point passes under the eye or when the eye sees a color change an immediate interrupt signal is sent to the controller, at this point the servo motor, via roller 34, advances the material the distance set in the operator interface. The deceleration is calculated so that the material advance will be accurate to +−0.05 mm. At this point the material remains stopped for the cutting, e.g., knife delay time set on the operator interface. The material then advances and follows the same sequence above.

A typical setting for the advance is the width of the label (length along loom cut edge) minus 5 mm. This number may be adjusted to influence centering of the logo. Additional adjustment can be made if necessary.

At the stop, carrier strip 12 is advanced over a peeler 44 presenting the RF devices 20 to ribbon of material 36. The carrier strip minus devices 20 is rewound unto roller 46. Applicator 40 includes an anvil and attached piston 48. Anvil 48 includes a vacuum device which attracts ribbon of material 36. The piston activates an ultrasonic horn 50 which welds the RF device to ribbon of material 36. The applicator unit is adjustable via a frame 52 to align with the logo on folded ribbon of labels 30.

The ribbon of material 36 with the RF devices 20 mounted thereon is guided by roller 38 and drive roller 34 to cutting station 60. The RF device is registered with the logo on the label ribbon by advance of both ribbons 30, 36 through drive roller 34 and optic eye 42.

The material is cut at cutting station 60 to form folded labels 70 using an ultrasonic system 62 comprising a horn 64 and an anvil 66. For example, the ultrasonic horn 64 has sound waves moving through it at a frequency of 20–40 KHz. The residence of these waves can be magnified through proper booster and horn combination.

Anvil 66 is actuated at an adjustable pressure to collide with the horn. The material passes between the horn and the anvil and is exposed to very high-localized heat, cutting and sealing the material. The larger the radius on the anvil the larger the seal area and the more pressure required for a cut. The default delay time for the knife up is calculated and taken into account. For example, a typical delay is 70 ms, which may be adjusted if necessary to accomplish the desired results. Ultrasonic rotary dies can also be used.

The cutting station can utilize other known cutting techniques to subdivide the ribbon into individual labels. Such techniques include, for example, cold or hot shearing knives, hot fuse knives that squeeze off the product during cutting, extreme high mechanical pressure, high-pressure air, high-pressure water, laser cutting, rotary die cutters, and others. In the case of the fabric carrier, the fabric carrier is cut and bonded to the cut edges of the label. The fabric layer can be within a centerfold label, along the back of a centerfold label, along the front of a centerfold label along the back of an end fold label, along the front of an end fold label, along the front of an end fold label, or any of the above conditions on other labels processed on the equipment.

After cutting the finished label, the process proceeds to a packer (not shown). The packer then pushes the label into a packing box. Packing of the cut labels can also be accomplished by bagging or placing the goods in boxes through any number of methods including single column stacks in horizontal or vertical orientation, curved stacker frays, or magazine devices in a rotary or sliding configuration.

Unlike centerfold labels produced using traditional techniques, the centerfold label of the present invention has the front and back folds sealed together along an edge with the RF device therein. By using alternative folding stations, the apparatus of the present invention can be used to form other varieties of folded labels. For example, to form "end-fold" labels.

Figure 6:
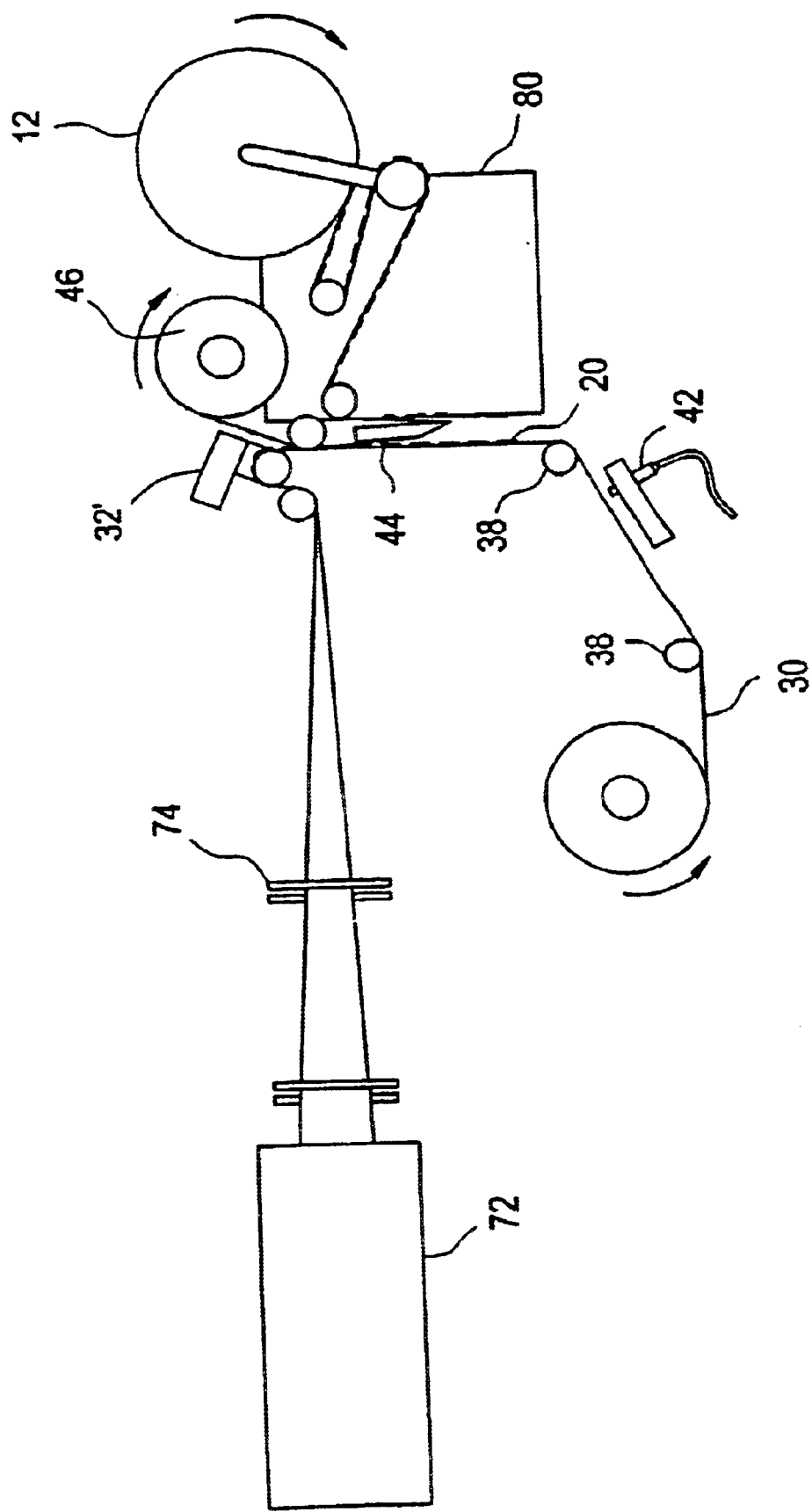
FIG. 6 is a perspective view of an apparatus according to another embodiment of the present invention for producing a RF label.

FIG. 6 illustrates another embodiment of the present invention wherein the RF device is adhered to the ribbon of labels prior to the folding step. In this embodiment, the roll of ribbon of labels 30 is advanced by two linear drive mechanisms. The first linear advance mechanism 72 is part of the press station and is an uninterrupted linear advance which maintains tension during folding. The second is an indexing mechanism. As in the previous embodiment, mechanism 72 can be a pair of drive rollers or other mechanically equivalent advance. Ribbon of labels 30 is advanced along guide rollers 38 pass optical eye 42 and an application unit 80. Optical eye 42 provides the signal for the placement of the RF device as the ribbon of labels is in motion.

Application unit 80 includes a blower which blows the RF device 20, such as an electronic article surveillance tag, onto ribbon of labels 30. Blower 80 is commercially available through Label-Aire, Inc., Custom Label-Aire Model 2111M combination air blow left hand labeled. The devices 20 are supported on a roll of carrier strip 12, as previously discussed herein. As in the embodiment of FIG. 5, after RF device 20 is applied to ribbon of labels 30, the carrier strip 12 is separated therefrom by peeler 44 and rewound on roll 46.

The ribbon of labels 30 with RF devices 20 thereon passes through press unit 32' which adheres the RF devices to ribbon of labels 30. The ribbon of labels 30 then passes into the folding station 74 where the ribbon is folded, as previously set forth herein. After folding, the ribbon can pass to either a cutting device or rolled into a roll for further processing remote from the apparatus.

Figure 8:
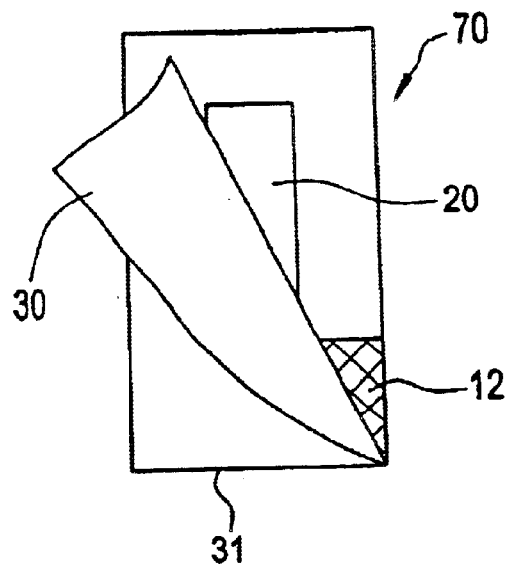
FIG. 8 illustrates a label having a RF device incorporated therein in accordance with the apparatus of FIG. 7, with an edge of the label pulled away.
Figure 9:
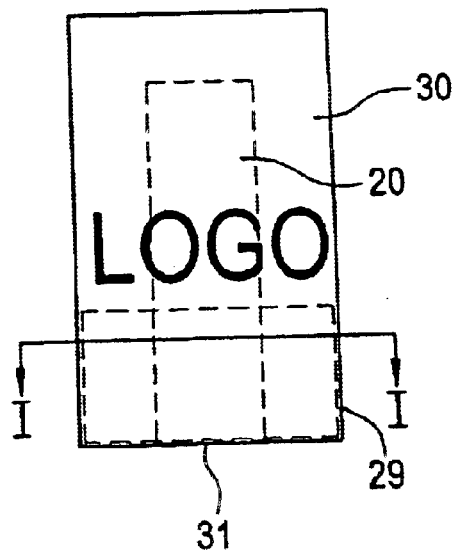
FIG. 9 illustrates a RF label with ultrasonically bonded edges in accordance with the apparatus and methods of the present invention.
Figure 10:
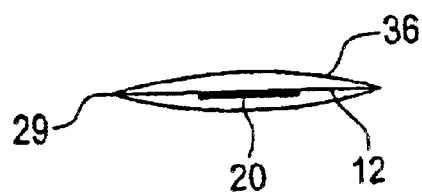
FIG. 10 is a cross-sectional view of the label of FIG. 9 taken along line I—I.

A label made according to the method and apparatus whereby the RF device is not separated from the carrier strip is illustrated in FIGS. 8–10. The label is unique in that the cut sides are bonded and sealed along an edge. At the cut, the carrier is bonded to the edges of the individual RF label upon separation of the label from the ribbon of labels. As noted above, the resultant labels have a unique smooth feel based upon the process used to make them. Furthermore, thermoplastic ribbon of labels, preferably a woven polyester, is subdivided using an ultrasonic system as part of the claimed apparatus, the labels are unique in that the cut sides are bonded or welded together. As noted above, this bonding not only prevents the label from being skewed when sewed into a garment, but also provides the edges with a generally scratchless feel.

The apparatus of the invention is particularly suited for insertion of devices such as security and inventory control devices, e.g., radio frequency inventory devices (RFID) tags, into labels. RFIDs are known in the art and include that disclosed in U.S. Pat. Nos. 5,874,902; 5,874,896; 5,785,181; and 5,745,036. Such devices can be inserted at a number of locations. By using an ultrasonic cutting system, these devices can be sealed into the bonded top and bottom edges of the material. This will cause the label to be destroyed if the device is removed; thus guaranteeing the tag and label stay as one during processing. At one location, the folded material is opened and the device is inserted at desired positions. At another location, adhesive backed devices are placed on the material before folding. Edge sealing can be achieved with these methods as well.

The RFID tag can include a scannable circuit board chip. The RFID technology will allow a RF label to be read or written to. The ability to write to the RF labels enables users to keep and update a database without the end user being able to alter the information on the embedded circuit board. In addition, the identification information may be reused and written over.

Look-up databases can be readily available to facilitate quick access to the information embedded on the RF labels. Moreover, lost or stolen items having the RF labels can be reunited with its owner or place of origin.

The scannable RF labels enables tracking of inventory, pricing and place of origin, without necessitating human intervention to research such information. The programmable and read-only scannable circuit boards cannot be altered or read without a programmer or reader. The RFID system typically consist of one or more transceivers (exciters) and one or more tags. An RFID tag is an electronic device that generally incorporates a specific and unique identification number, where the number may be read by a RF transceiver (transmitter/receiver) system. The RFID tags may acquire energy from the incident radio frequency field or powered by a battery.

RFID tags typically consists of an antenna or a coil, to collect RF energy, and an integrated circuit (IC) which contains identification code or other information in its on-chip memory. Attaching a RFID tag to a label enables the item to be located and identified with the aid of an RF interrogation system. As such, an interrogation system is able to identify information associated with the RFID labels as set forth in the present invention.

Commercially available RFID tags generally operate at low frequencies, typically below 1 Mhz. Although lower frequency devices are more common, a wide range of high frequencies are available, for example, 13.56 Mhz, 915 Mhz, 2.45 Ghz and 5.6 Ghz. Low frequency tags usually employ a multi-turn coil resulting in a tag having a thickness much greater than a standard sheet of paper. 2.45 Ghz and 5.6 Ghz can be done in a single turn or as a die pole antenna. High frequency passive RFID tags, which operate at around 2.54 Ghz, typically consist of a single turn, flat antenna, printed onto a flat single layer sheet of plastic or paper.

The combination of the folded labels with a RF device in the present invention allows for locating and tracking of items, detecting items and reporting of pricing, for example. This ability to read RF labels from codes may be utilized, for example, as the items having the RF labels leave predetermined areas and pass through an exit.

Figure 7:
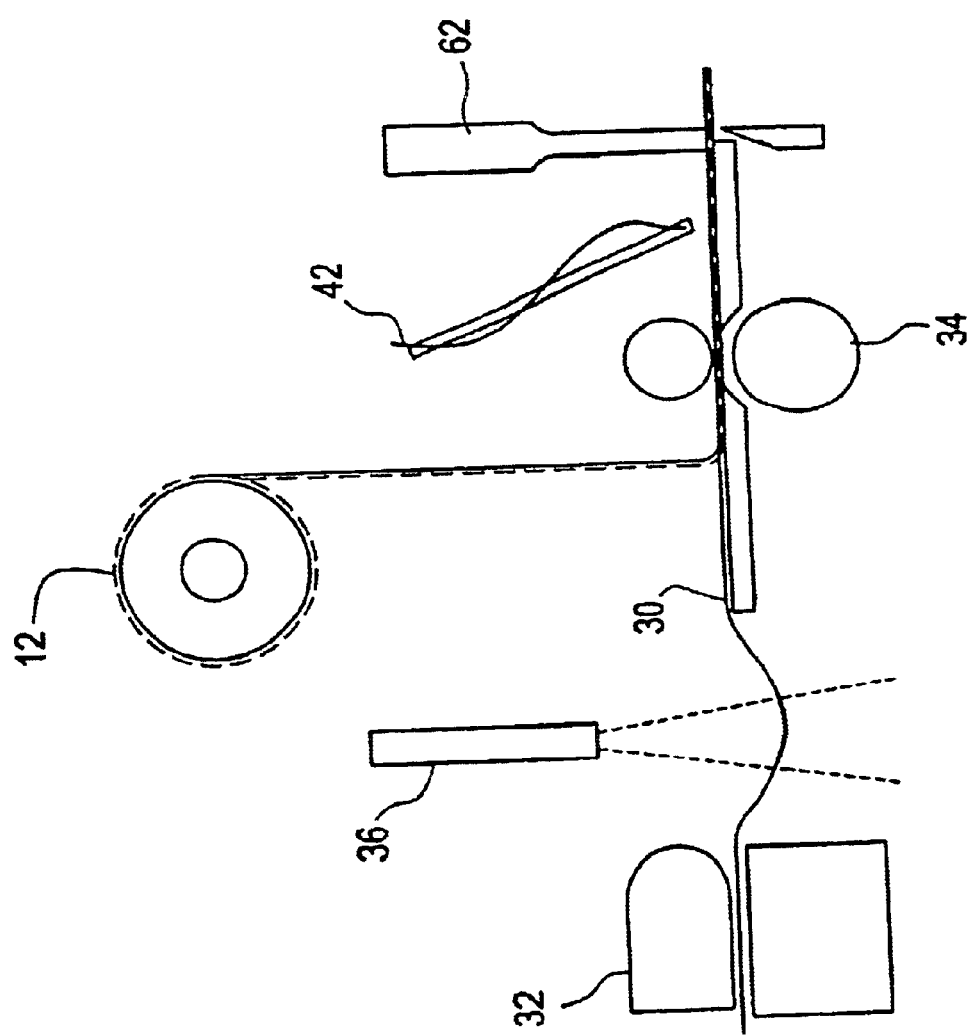
FIG. 7 is a perspective view of an apparatus for producing a folded label incorporating an RF device according to another embodiment of the invention.

Referring to the apparatus of FIG. 7, the RF devices 20 are not separated from carrier strip 12 but inserted into a label while on strip 12. Carrier strip 12 together with ribbon material 30 are advanced by drive roller 34 past optic eye 42 to ultrasonic cutting station 62 where the labels can be cut.

Such a center fold label is illustrated in FIGS. 8–10. Label 70 with the RF device 20 and carrier strip 12 is disposed in folded ribbon of labels 30. In FIG. 8, a portion of the material is pulled back showing device 20 and a portion of the carrier strip 12 to which it is mounted. The edge 12a of strip 12 is located at the folded edge 31 of the ribbon material. In the assembled state, as shown in FIGS. 9 and 10, the carrier strip is bonded into the inside edges 29 of the label by the ultrasonic cutting device of the present invention.

Figure 11:
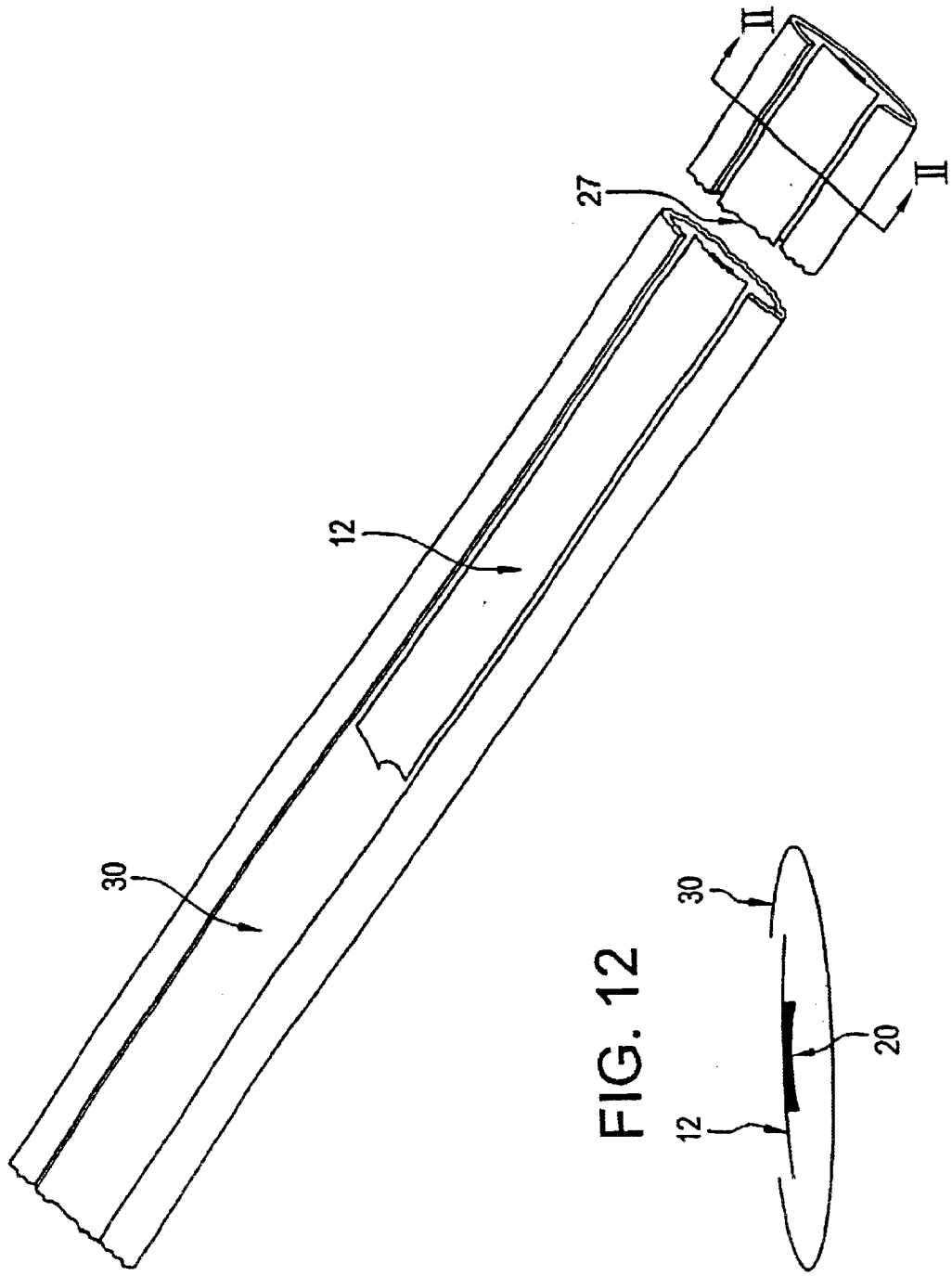
FIG. 11 is a perspective view of an end folded label produced by the apparatus and method of the present invention.
Figure 12:
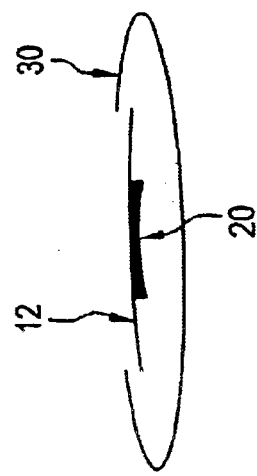
FIG. 12 is a cross-section of the label of FIG. 11, taken along line II—II of FIG. 11.

FIG. 11 is a perspective view of an end fold label made according to the apparatus and method of FIG. 7. As shown, label of ribbons 30, carrier strip 12 and RF device 20 disposed therebetween are subdivided along edge 27 into individual labels. Referring to FIG. 12, the ends of label 30 are folded over strip 12.

Figure 13:
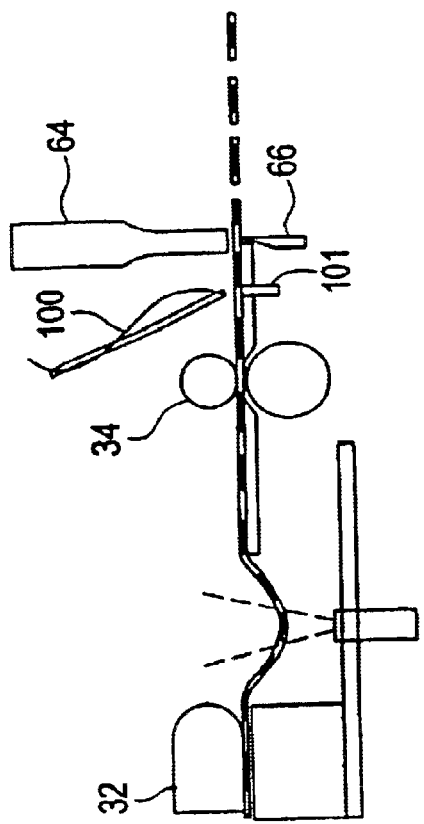
FIG. 13 is a perspective view of an apparatus for producing a folded label having an RF device incorporated therein according to another embodiment of the present invention.

FIG. 13 illustrates an apparatus for applying a radio frequency device into the ribbons of labels and registering the cut of the ribbons of labels by sensing the edge or part of the RF device disposed inside the folded ribbon. As illustrated, a length of the ribbon of labels 30, RF devices 20 and carrier strip 12 passes through press station 32, past drive rollers 34, past sensor 100 and light source 101, to ultrasonic horn 64 and anvil 66. The RF device disposed inside of the folded ribbon is detected by optical sensor 100 via light source 101, which shines light through the ribbon of labels, but does not shine light through the device embedded therein. The advance mechanism indexes the ribbon by detection of the RF device, not by the logo or text on the front of the ribbon. As the device passes by light sensor 101, the light will go out until the RF device passes. Optical sensor 100 senses the absence of light as the RF device passes. Alternatively, a sensor that would sense the metal component in the RF device could also be used to sense the edge or part of the RF device inside the folded ribbon.

Figure 14:
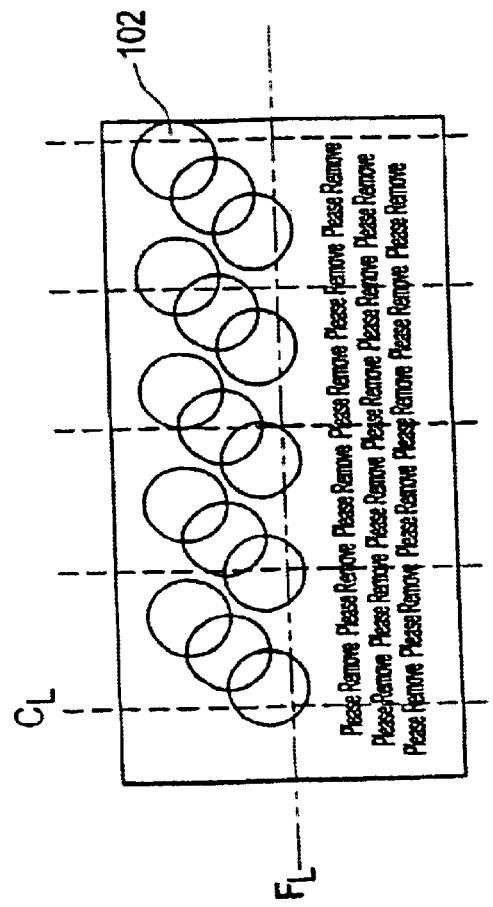
FIG. 14 illustrates a RF label made according to the embodiment of FIG. 13.

A label made according to the method and apparatus of FIG. 13, is shown in FIG. 14. As shown, the design or logo 102 can be repeated anywhere on the label and need not be centered with regard to cut line $C_L$. In the case of a "cut it out before you wear" label as shown in FIG. 14, the text can be written in succession on the label. Subdivision of the label does not depend on the position of the text, but only on the position of the RF device therein. The same applies to a permanent label.

The apparatus of the present invention can be modified at any point to include various accessories. A vision system can be included to inspect the logos and image on the material as it passes. Labels with errors are detected and removed automatically.

Additionally, the apparatus can be modified such that the cutting station the corners of the cut material are removed to provide for heightened comfort. Further, the apparatus can be modified to ultrasonically seal the open loom cut edge giving a centerfold label, for example, three ultrasonically sealed edges and one folded edge.

Specially, it will be understood that the instant invention applies to all various types of label types and is not intended to be limited by the manner in which the labels are developed.

The apparatus of this present invention may have several different folding stations or interchangeable folding stations, thus allowing the user to select different fold configurations. Alternatively, there may be a series of components that function in one overall device. The press and cutting stations are electronically linked by means of at least one sensor to coordinate operation.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A method for producing individual folded labels incorporating an anti-theft device, the method comprising the steps of:

providing a ribbon of labels;

providing a carrier strip with a plurality of anti-theft devices spaced thereon;

separating the plurality of radio frequency devices from the carrier strip;

applying the separated plurality of antitheft devices to a ribbon of material; then joining the plurality of anti-theft devices to the ribbon of labels; then folding the ribbon of labels so as to form at least one folded portion;

subjecting the folded ribbon to sufficient heat and pressure to set the at least one folded portion; and subdividing the ribbon of labels into individual folded labels.

2. A method for producing individual folded labels incorporating a radio frequency device, the method comprising the steps of:

providing a ribbon of labels;

providing a carrier strip with a plurality of radio frequency devices spaced thereon;

separating the plurality of radio frequency devices from the carrier strip;

applying the separated plurality of radio frequency devices to a ribbon of material; then joining the plurality of radio frequency devices to the ribbon of labels; then folding the ribbon of labels so as to form at least one folded portion;

subjecting the folded ribbon to sufficient heat and pressure to set the at least one folded portion; and subdividing the ribbon of labels into individual folded labels.

3. The method of claim 2, wherein the ribbon of labels are ultrasonically subdivided into folded labels having cut edges, and the wherein the cut edges are sealed and bonded together.

4. The method of claim 2, wherein the step of providing a carrier strip with a plurality of radio frequency devices spaced thereon further comprises the steps of providing a carrier strip and ultrasonically adhering the plurality of radio frequency devices at spaced intervals to the carrier strip.

5. The method of claim 2, wherein the step of applying the plurality of radio frequency devices to the ribbon of material comprises ultrasonically welding the plurality of radio frequency devices at spaced intervals along the ribbon of material.

6. The method of claim 5, wherein the step of joining the plurality of radio frequency devices to the ribbon of labels comprises presenting the ribbon of material with the plurality of radio frequency devices disposed thereon to the ribbon of labels and sandwiching the radio frequency devices between the ribbon of material and the ribbon of labels.

7. The method of claim 6, wherein the step of subdividing the ribbon of labels into individual folded labels comprises ultrasonically subdividing the joined ribbon of material and ribbon of labels with the plurality of radio frequency devices disposed therebetween into folded labels having cut edges, and the wherein the cut edges are sealed and bonded together.

8. The method of claim 7, further comprising the step of sensing a position of the plurality of radio frequency devices prior to ultrasonically subdividing the joined ribbon of material and ribbon of labels.

9. The method of claim 7, wherein the ribbon of material is folded prior to the step of joining the plurality of radio frequency devices thereto.

10. The method of claim 2, wherein the step of applying the plurality of radio frequency devices to the ribbon of material comprises adhering the plurality of radio frequency devices at spaced intervals along the ribbon of material.

11. The method of claim 10, wherein the ribbon of material is folded after the plurality of radio frequency devices are adhered thereto.

* * * * *